United States Patent [19]

Smith

[11] 3,720,943

[45] March 13, 1973

[54] VEHICLE ACTIVITY RECORDING DEVICE

[75] Inventor: William Van Smith, Memphis, Tenn.

[73] Assignee: Lectrolarm Custom Systems, Inc., Memphis, Tenn.

[22] Filed: April 28, 1972

[21] Appl. No.: 248,721

[52] U.S. Cl. ..........................346/7, 346/42, 346/62, 346/113, 346/123

[51] Int. Cl. ..............................................G01d 9/32

[58] Field of Search......346/7, 123, 121, 122, 62–64, 346/42, 139 R

[56] References Cited

UNITED STATES PATENTS

| | | | |
|---|---|---|---|
| 1,080,306 | 12/1913 | Silliman | 346/121 |
| 2,051,986 | 8/1936 | Cool | 346/123 X |

*Primary Examiner*—Joseph W. Hartary
*Attorney*—John R. Walker, III

[57] ABSTRACT

A device for attachment to a vehicle to record the periods of time in which the vehicle is standing, in motion, and/or certain doors thereof are open or closed. The device includes a marking instrument, e.g., a stylus, which is supported by a vibration sensitive arm. The stylus is in constant engagement with a recording disk. A clock rotatably drives the disk at a predetermined rate. Peculiar helix drive structure is included for gradually moving the stylus ever closer to the center of the disk, which causes the stylus to scribe ever decreasing concentric circles onto the disk, i.e., one circle every 24 hours. When the vehicle is moving, the stylus vibrates up and down. However, structure is included to limit the travel of the stylus as it vibrates, which causes the marks on the disk to correspond to the time in which the vehicle may be traveling, thereby being distinguishable from the time which the vehicle was standing. Structure is included that is responsive to the opening of certain doors of the vehicle which causes the marks on the disk to correspond to the time in which the door of the vehicle may be open, thereby being distinguishable from the time the door was closed.

9 Claims, 8 Drawing Figures

VEHICLE ACTIVITY RECORDING DEVICE

BACKGROUND OF THE INVENTION

1. Field of the Invention

This invention pertains to vehicle activity recording devices.

2. Description of the Prior Art

The state of the art of vehicle activity recording devices is highly developed. Additionally, instruments for recording the opening and closing times of a door are not new, as evidenced by the Cool U.S. Pat. No. 2,051,986. The '986 patent exclusively is directed toward recording the time which doors of stores, factories, and the like are opened and/or closed. However, none of the known prior devices have the capability of recording the time in which a vehicle is in motion, as well as recording the time in which a door thereof may be open or closed.

A preliminary patentability search revealed the above-mentioned '986 patent and the following U. S. Pat. Nos.: 963,055; 1,001,220; 1,039,093; 1,198,953; 1,320,097; 1,700,399; 2,616,778; 3,197,779; 3,281,854; 3,369,248; and 3,383,696. None of the above patents show or suggest applicant's device.

SUMMARY OF THE INVENTION

The concept of the present invention is to provide a device for attachment to a vehicle to record the period of time in which the vehicle is standing, in motion, and/or certain doors thereof are open or closed. The device includes a marking instrument, e. g., a stylus or the like, which is supported by a vibration sensitive arm. The stylus is in constant engagement with a recording disk. A clock rotatably drives the disk at predetermined rate. Peculiar helix drive structure is included for gradually moving the marking instrument ever closer to the center of the disk which causes the marking instrument to scribe ever decreasing concentric circles onto the disk, e. g., one circle every 24 hours. When the vehicle is moving, the marking instrument vibrates along a vertical axis, however, structure is included to limit the travel of the stylus as it vibrates which causes the marks on the disk to correspond to the time in which the vehicle may be traveling, thereby being distinguishable from the scribe marks made thereon during the time in which the vehicle was standing. Other structure is included that is responsive to opening certain doors of the vehicle which causes the marks on the disk to correspond to the time in which the doors of the vehicle may be open, thereby being distinguishable from the above-mentioned marks and the time during which the door was closed.

DESCRIPTION OF THE PREFERRED EMBODIMENT

Figure 1:
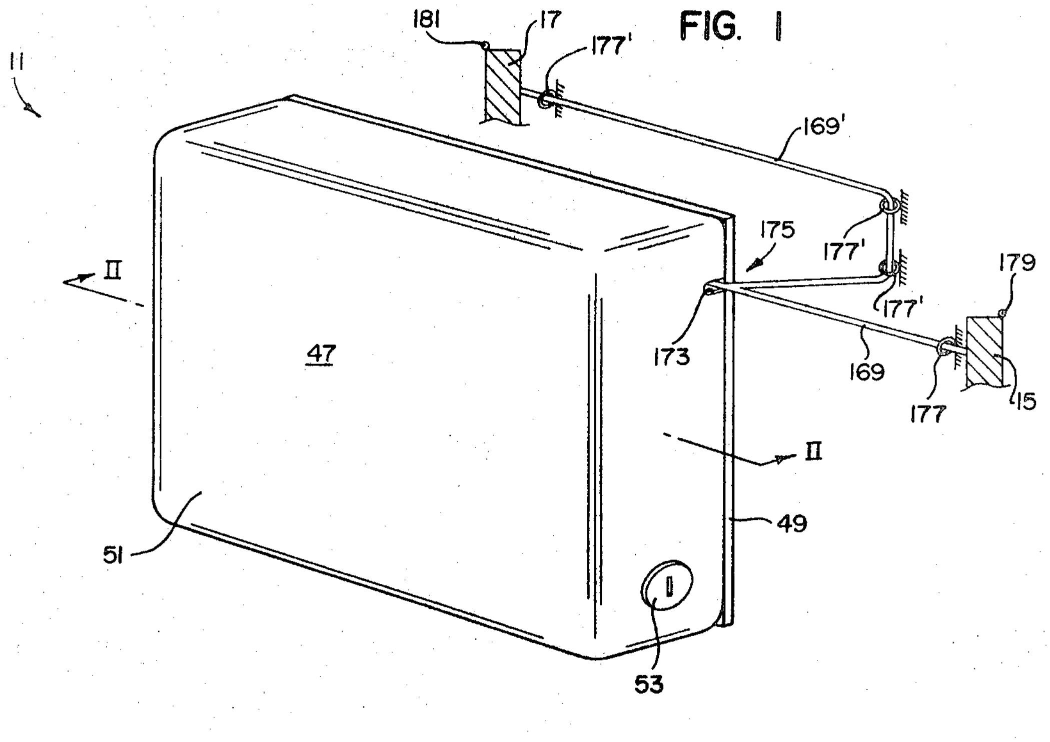
FIG. 1 is a perspective view of the vehicle activity recording device of the present invention schematically depicting cable structure leading therefrom and being anchored to certain doors of the vehicle.

The activity recording device 11 of the present invention is intended for attachment to a vehicle to record distinctively the respective periods of time in which the vehicle is standing, in motion, and/or certain doors thereof are open and closed. A portion of the vehicle is shown in the drawings and is depicted therein by the numeral 13 to illustrate a typical installation of the device 11. Additionally, certain doors, e. g., a tailgate door 15, opens into a cargo section of the vehicle 13 and a curbside door 17 thereof, are schematically depicted in order to illustrate one method of actuating certain structure of the device 11 yet to be disclosed.

The device 11 includes a disk 19 (FIG. 8) having certain indicia thereon, e. g., a plurality of radial lines 21, preferably 24 in all, to represent the 24 hours in a day and other markings (not shown) to represent the seven days in a week. A planar platen means 23 is provided for supporting the disk 19. Clock means 25 is provided for rotatably driving the platen 23 at a predetermined rate. More specifically, the clock means 25 of known construction includes a horizontally disposed output shaft 27 having the platen 23 and the disk 19 attached thereto. In other words, the disk 19 has a concentric aperture 29 and the platen 23 has a concentric aperture 31 both of which receive the shaft 27. Additionally, a boss member 33 and a knurled nut 35 are threadedly received on the shaft 27, i. e., the boss member 33 contiguously engaging a portion of the back side 37 of the platen 23 and the knurled nut 35 contiguously engaging a portion of the disk 19 with the disk 19 contiguously engaging the planar face 39 of the platen 23.

Figure 2:
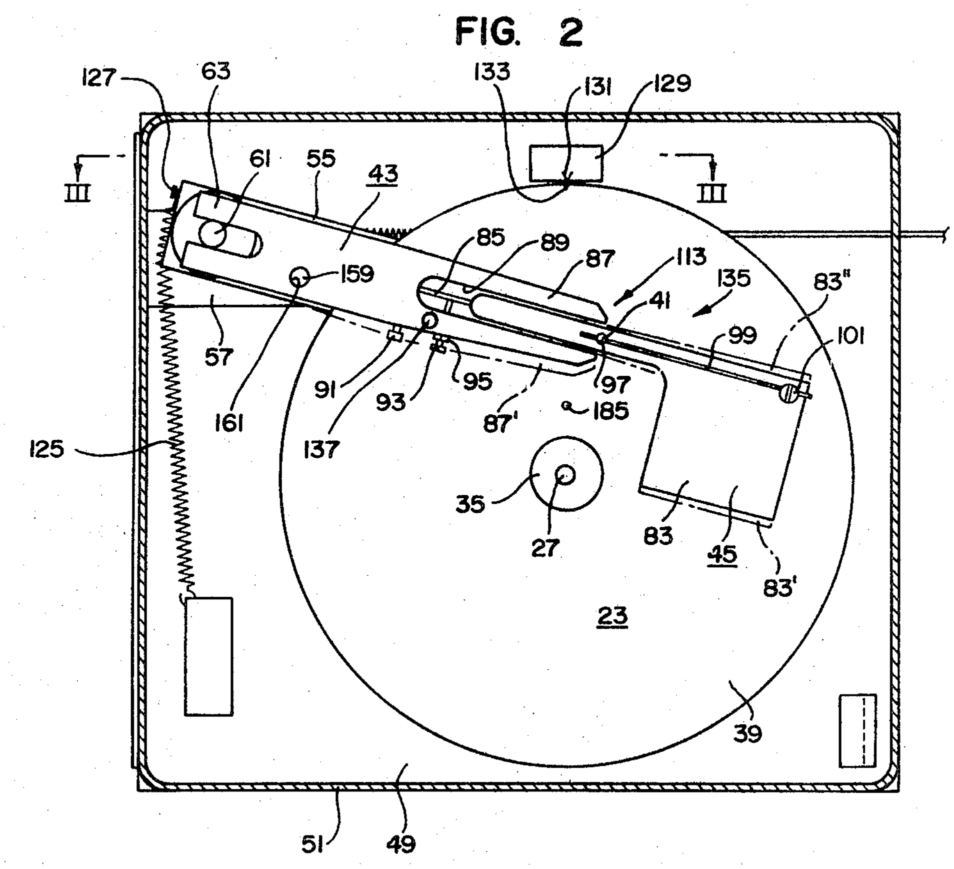
FIG. 2 is a sectional view taken as on the line II—II of FIG. 1.
Figure 4:
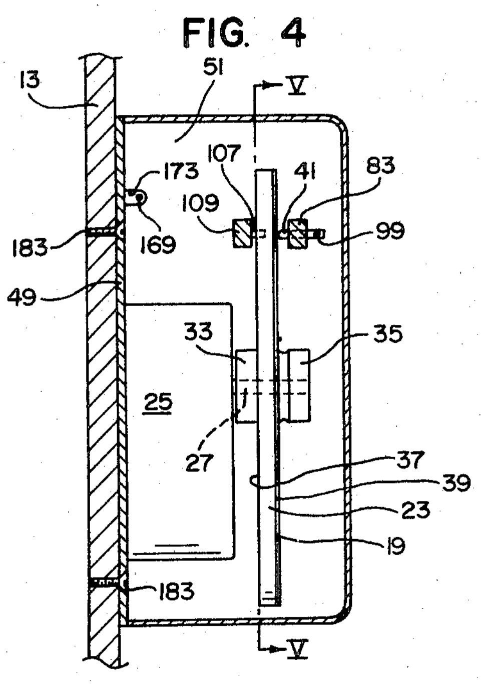
FIG. 4 is a sectional view taken as on the line IV—IV of FIG. 3.

The device 11 preferably should be oriented substantially as depicted in FIGS. 1, 2, and 4 of the drawings, i. e., with the platen 23 being disposed in a vertical plane and certain other structure yet to be disclosed positioned substantially as depicted, the reasons for which will be obvious when the remaining structure has been disclosed. Also included is a pointed marking instrument 41 which may be a stylus for marking on stylus-sensitive paper, or it may be an ink pen or the like including structure obvious to those skilled in the art. However, I prefer that the disk 19 have a stylus-sensitive surface thereon and that the marking instrument 41 be a stylus. Therefore, when the word stylus is used hereinafter, it should be understood that it is only one example of a marking instrument 41.

The device 11 includes a marking instrument arm 43 which includes vibration-sensitive structure 45 for supporting the marking instrument 41. Additionally, enclosure structure 47 is provided having a base 49, a cover 51 hingedly attached thereto, as with hinge means 52, and suitable means 53 for locking the cover 51 to the base 49. Also included are drive arm structure 55 (FIG. 3) and arm support means 57 for supporting the marking instrument arm 43 and the drive arm 55. The arm support means 57, being blocklike structure formed from suitably shaped steel or the like, is fixedly attached to the base 49 in a well known manner, as by a plurality of bolts (not shown). A horizontal aperture 59 is provided in the arm support means 57 for receiving the rod-like first pivot means 61 which pivotally attaches the respective inner ends 63, 65 of the marking instrument arm 43 and the drive arm 55 to the arm support means 57.

Figure 3:
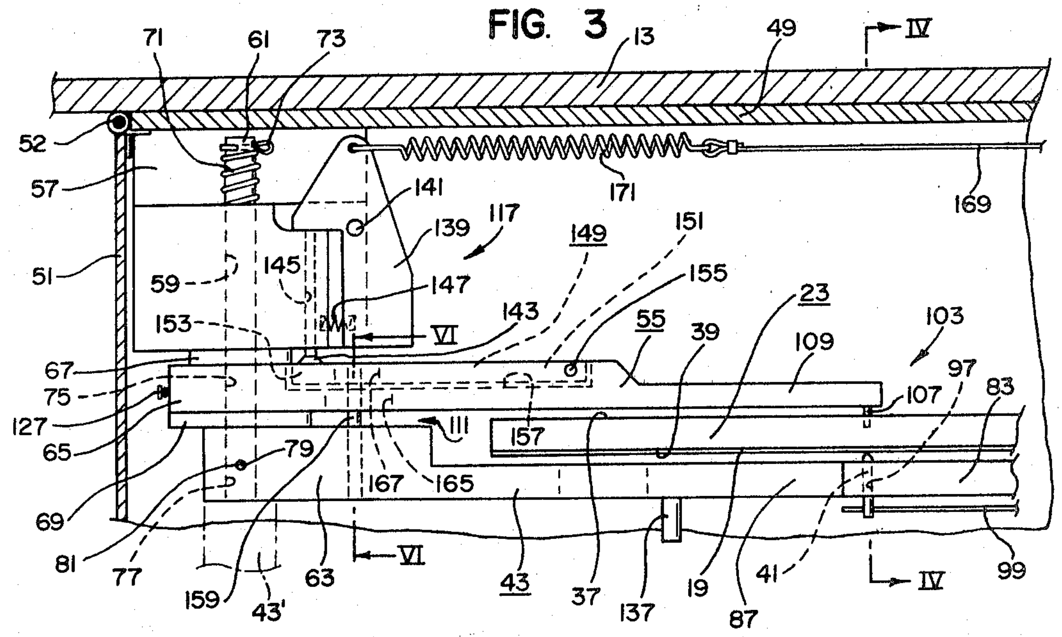
FIG. 3 is an enlarged sectional view taken as on the line III—III of FIG. 2.

From FIG. 3 of the drawings, it may also be seen that the marking instrument arm 43 and the drive arm 55 are normally parallel one with the other, and a self-lubricating washer 67, e. g., formed from teflon or the like, is placed between the drive arm 55 and the arm support means 57 and a self-lubricating washer 69, e. g., brass or the like, is placed between the marking instrument arm 43 and the drive arm structure 55. The pivot means 61 extends through a compression spring 71 with one end of the compression spring resting against a portion of the support means 57 and the other end of the compression spring resting against the lock means 73, e. g., a cotter pin or the like. In other words, transverse apertures 75, 77, respectively, are provided in the inner ends 65, 63 of the drive arm 55 and the marking instrument arm 43. Thus, the pivot means 61 is free to slide towards and away from the base 49 within the aperture 59. The outer end of the pivot means 61 is provided with a transverse aperture 79 for receiving a second pivot means 81, i. e., the inner end 63 of the marking instrument arm 43 being provided with a suitable aperture in alignment with the aperture 79 for also receiving the pivot means 81. Therefore, the marking instrument arm 43 is free to be manually pivoted substantially vertically about the second pivot means 81 between a marking instrument engaged position shown in full lines in FIG. 3 and character referenced by the numeral 43 and a marking instrument disengaged position shown in broken lines in FIG. 3 and character referenced by the numeral 43'. From FIG. 2 of the drawings, it may be seen that the first pivot means 61 is substantially parallel with the shaft 27. Therefore, when the marking instrument arm 43 is in the marking instrument engaged position, the marking instrument arm 43 and the pivot means 61 may be rotated about the arm support means 57, thus the stylus 41 may be moved from the outer perimeter of the platen 23 (FIG. 2) toward the shaft 27.

The vibration sensitive structure 45 includes a mass 83 which is attached to the marking instrument arm 43 by a leaf spring 85. More specifically, the outer end 87 of the marking instrument arm 43 defines an elongated slot 89 for receiving a portion of the mass 83 substantially as depicted in FIG. 2 of the drawings. One end of the spring 85 is suitably attached to the mass 83 and the opposite end suitably engages the arm 43 and is attached thereto by a set screw 91.

The vibration sensitive structure 45 also includes means for selectively adjusting the sensitivity of the vibration sensitive means. The sensitivity adjustment means includes a set screw 93 which extends into the slot 89 with the inner end thereof engaging the leaf spring 85. Tightening of set screw 93 against the leaf spring 85 decreases the sensitivity of the vibration sensitive structure, and loosening the set screw 93 increases the sensitivity of the vibration sensitive structure 45. A jamb nut 95 is provided for locking the set screw sensitivity adjustment means 93 once the desired sensitivity thereof is achieved.

From FIGS. 2 and 3 of the drawings, it may be seen that the marking instrument or stylus 41 is received in an aperture 97 provided in the mass 83. Additionally, the outer end of the stylus 41 is suitably provided with a transverse aperture for receiving one end of a piano wire spring 99 which urges the stylus 41 inwardly against the disk 19. A suitable aperture is also provided in the mass 83 for receiving a screw 101 which attaches the opposite end of the spring 99 to the mass 83.

The device 11 includes helix drive means 103 (FIG. 3) for gradually moving the stylus 41 ever closer to the shaft 27 as the platen 23 rotates. The helix drive means 103 includes providing the back side 37 of the platen 23 with an elongated helical groove 105, as clearly shown in FIG. 5 of the drawings and a drive pin 107 (FIG. 3) which is attached to the outer end 109 of the drive arm structure 55. The drive pin 107 normally engages the helical groove 105 and as the platen rotates, the drive pin 107 is gradually moving closer to the shaft 27, i. e., causing the drive arm 55 to pivot about the pivot means 61 or the arm 55 and pivot pin 61 to pivot about the support means 57.

The device 11 also includes coupling means 111 (FIGS. 3, 6, 7) for coupling the marking instrument arm 43 to the drive arm structure 55 to cause the marking instrument arm 43 to move in unison with the drive arm structure 55. From FIG. 3 of the drawings, it may be seen that the drive arm structure 55 is adjacent the back side 37 of the platen 23 and the marking instrument arm 43 is adjacent the face side 39 of the platen 23.

Figure 5:
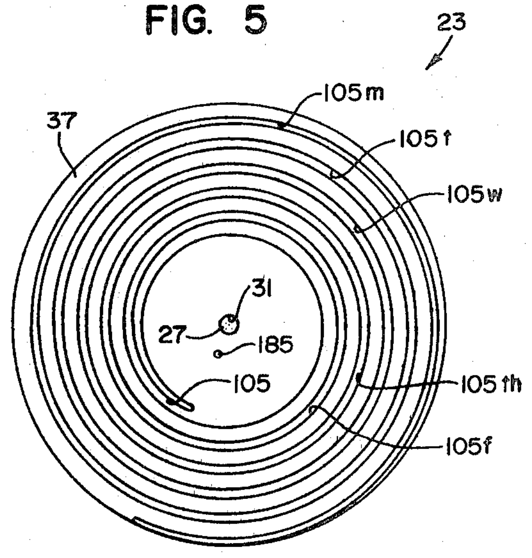
FIG. 5 is a view of the back side of the platen showing an elongated helical groove provided therein.

It should be pointed out that the helical groove 105 is formed by constructing an elongated groove having several ever decreasing concentric circles thereto, e. g., seven circles thus representing the seven days of the week. However, it will be appreciated that for brevity and clarity, only five concentric circles are shown in FIG. 5 and are character referenced therein by the numeral and letter suffixes 105M, 105T; 105W; 105TH; and 105F, representing the five work days of the week.

The device 11 includes means 113 (FIG. 2) for limiting the vibration of the marking instrument arm, i. e., the mass 83 thereof, between a first position wherein the mass 83 is a predetermined radial distance from the shaft 27 and a second position wherein the mass 83 is further away from the shaft 27. More specifically, the vibration limiting means 113 includes the outer end 87 of the arm 43 which defines the slot 89, i. e., the mass 83 being free to vibrate between the first position phantomized in FIG. 2 and character referenced therein by the numeral 83' and the second position phantomized in FIG. 2 and character referenced therein by the numeral 83''. In other words, the width of the slot 89 and the tension on the sensitivity adjustment means 93 will determine the limits and bounds of the first position 83' and the second position 83''.

Figure 8:
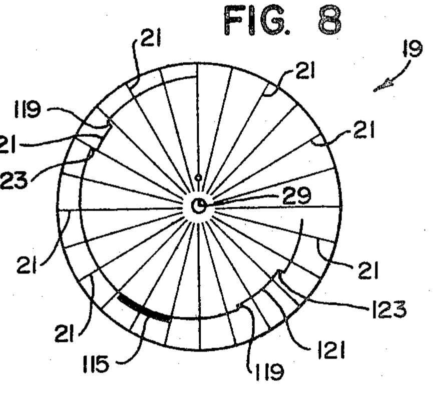
FIG. 8 is a side elevational view of the recording disk showing a recording or line segment scribed thereon.

Referring now to FIG. 8 of the drawings, wherein a broad line segment 115 depicts the radial scribe marks thereon corresponding to the just described vertical movement of the marking instrument, i. e., between the first position 83' and the second position 83'' only. In other words, the line segment 115 appears on the disk 19 as a solid arcuate bar indicating the time the vehicle was moving.

The device 11 includes means 117 (FIG. 3) responsive to the opening of either of the doors 15, 17 of the vehicle 13 for rapidly moving the marking instrument or stylus 41 vertically between the first position 83' and a third position wherein the marking instrument 41 is closer to the shaft 27 than when in the first position 83'. More specifically, the third position alluded to is accomplished by structure yet to be disclosed where with fractional rotation of the outer end 87 of the arm 43 about the pivot means 61 is accomplished. Therefore, the third position is depicted in phantom in FIG. 2 of the drawings and is character referenced therein by the numeral 87'. Referring now to FIG. 8 of the drawings wherein it may be seen that narrow radial line segments 119 correspond to the vertical movement of the marking instrument 41 as a result of opening of either of the doors 15, 17. Additionally, arcuate line segments 121 depict the period of time in which the door remained open and radial line segments 123 correspond to the time in which the door was closed.

It should be understood that moving the arm 43 to the marking instrument disengaged position 43' (FIG. 3) disengages the coupling means 111. Further, removing the knurled nut 35 from the shaft 27 facilitates removal of the platen 23 therefrom. Removing the platen 23 disengages the drive pin 107 from the helical groove 105. The device 11 includes spring means 125 (FIG. 2) for urging the outer end 109 of the drive arm structure 55 radially away from the shaft 27, i. e., when the platen 23 has been removed from the shaft 27 as above disclosed. The spring means 125, being a pull spring, has one of the ends thereof attached to the inner end 65 of the drive arm by a rivet 127 (FIG. 3) or the like, and the other end thereof is suitably attached to the base 49. A stop bar 129 (FIG. 2) is suitably attached to the base 49 for limiting the upward travel of the outer end 109 of the arm 55. From FIG. 2 of the drawings, it may also be seen that the stop bar 129 is provided with alignment indicia 131 and the platen 23 is provided with alignment indicia 133 to facilitate replacement of the platen, i. e., the alignment indicia 133 is placed adjacent the alignment indicia 131 to assure that the drive pin 107 is properly positioned with respect to the helical groove 105M.

The device 11 includes overpowering means 135 (FIG. 2) for overpowering the spring means 125 when the marking instrument arm 43 is in the marking instrument engage position, as above described. The overpowering means 135 includes the arm 43 and the mass 83. In other words, the moment arm of the mass 83 and the arm 43 in addition to the moment arm of the drive arm structure 55 overpowers the tension of the spring means 125 to allow the marking instrument arm 43 and the drive arm structure 55 to gradually gravitate toward the shaft 27 as the drive pin 107 tracks the helical groove 105.

The device 11 includes cover engaging means 137 (FIGS. 2, 3) attached to the marking instrument arm 43 for engaging the closed cover 51, thus preventing the marking instrument arm 43 from moving away from the previously described marking instrument engage position. The cover engaging means 137 preferably includes a teflon shaft or the like fixedly attached to the arm 43 being positioned thereon substantially as depicted in FIGS. 2 and 3 of the drawings.

The means 117 for moving the marking instrument 41 vertically between the previously described first and third positions includes bell crank means 139 (FIG. 3) pivotally attached to the arm support means 57 by pivot pin 141, the bell crank being free to pivot about a vertical axis. Also included is a horizontally disposed pin 143 which is slidably received in a horizontal aperture 145 provided in the arm support means 57. Spring means 147 is included for urging the horizontal pin 143 toward the drive arm 55, i. e., the spring 147 urges the bell crank 139 to rotate counterclockwise as viewed in FIG. 3 of the drawings or about the pin 141, thus applying pushing action on the inner end of the pin 143 as it is engaged by the bell crank 139. More specifically, the arm support means 57 is provided with a suitable bore for restingly receiving one end of the spring 147 and the bell crank 139 is provided with a suitable bore for receiving the opposite end of the compression spring 147.

The drive arm structure 55 includes cam bar means 149 (FIGS. 3, 6, 7) having inner and outer ends 151, 153 respectively thereto with the inner end 151 being pivotally attached to the drive arm 55 by a pivot pin 155 and being free to pivot about a substantially vertical axis. More specifically, the drive arm 55 preferably has a portion thereof milled away, establishing a recess 157 for receiving the cam bar means 149 as clearly shown in FIG. 3 of the drawings. It may also be seen in FIG. 3 of the drawings that the outer end of the horizontal pin 143 rests against the outer end 153 of the cam bar means 149 with the opposite end of the pin 143 resting against the bell crank 139, as previously disclosed.

The coupling means 111 for coupling the marking instrument arm 43 to the drive arm structure 55 includes a canted pin 159 (FIGS. 2, 6, 7) for engaging the cam bar means 149. The canted pin 159 is fixedly attached to the marking instrument arm 43 adjacent the inner end 63 thereof. More specifically, and referring to FIG. 6 and 7 of the drawings, the arm 43 is provided with a canted aperture 161 for receiving the canted pin 159, i. e., a set screw 163 locks the pin 159 to the arm 43. The pin 159 projects upwardly from the arm 43 in a non-horizontal non-vertical axis toward the drive arm structure 55 which is provided with an enlarged aperture 165 for allowing the canted pin 159 to freely pass therethrough. The outer end 151 of the cam bar means 149 is provided with an elongated canted aperture 167 which has the major axis thereof extending parallel with the cam bar means 149 and the minor axis thereof canted upwardly in a non-horizontal non-vertical axis toward the bell crank 139, as clearly shown in FIGS. 6 and 7 of the drawings.

Figure 6:
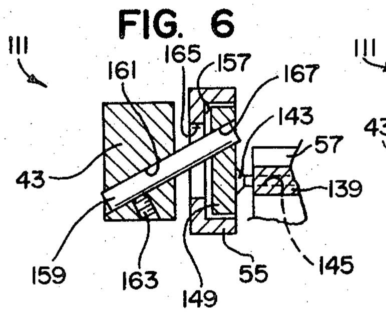
FIG. 6 is a sectional view taken as on the line VI—VI of FIG. 3.
Figure 7:
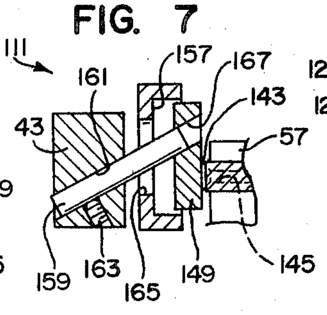
FIG. 7 is a view similar to FIG. 6 showing certain structure thereof displaced to another position as a result of one of the doors of the vehicle being opened.

The canted aperture 167 slidably receives the canted pin 159 selectively when the marking instrument arm 43 is in the previously described marking instrument engaged position as depicted in FIGS. 3, 6 and 7 of the drawings.

The means 117 also includes an elongated flexible cable 169 and a pull spring 171 (FIGS. 1, 3) for fractionally rotating the bell crank 139. More specifically, one end of the pull spring 171 is attached to the bell crank 139 and the opposite end thereof is suitably attached to the cable 169 substantially as depicted in FIG. 3 of the drawings. The cable 169 extends through an opening 173 in the cover 51 (FIGS. 1 and 4), thence to a Y-junction 175. From FIG. 1 of the drawings, it may be seen that the cable 169 extends from the Y-junction 175 to the tailgate door 15, i. e., guided by suitable eyelets 177. Additionally, a branch 169' of the cable extends from the junction 175 to the curbside door 17, i. e., being received by suitable guides or eyelets 177'. The door 15 is free to swing counterclockwise, as viewed in FIG. 1, i. e., about a hingepin 179, and the door 17 is free to swing clockwise, i. e., about a hingepin 181. Therefore, opening either door 15, 17 is effective to place tension on the spring 171 which causes the bell crank 139 to fractionally rotate clockwise as viewed in FIG. 3 of the drawings. It should be understood that the pull spring 171 may optionally be omitted without departing from the spirit and scope of the present invention.

From the above disclosure, it should now be apparent that fractional rotation of the bell crank 139, as above disclosed, is effective to allow the marking instrument arm 43 to gravitate downwardly to the position depicted in FIG. 2 of the drawings by the numeral 87'. More specifically, rotation of the bell crank 139 (FIG. 3) as above disclosed compresses the spring 147 which removes the pushing action on the pin 143. The moment arm of the mass 83 and the arm 43 tends to urge clockwise rotation of the arm 43 (FIG. 2) about the pivot means 61. However, from FIGS. 6 and 7 of the drawings, it may be seen that the canted pin 159 normally impedes this rotation, i. e., being engaged with the cam bar 149 as previously disclosed. It should be appreciated that the bar 149 is urged to the position depicted in FIG. 6 by the spring 147 indirectly pushing on the pin 143, i. e., the cam bar 149 is free to pivot vertically about the pivot pin 155. Therefore, removing the pushing force action upon the pin 143 allows the weight of the arm 43 to cam the cam bar 149 to a position as depicted in FIG. 7, i. e., causing slight rotation thereof about the pivot pin 155. Accordingly, the canted pin 159 moves downwardly as the cam bar 149 pivots about the pivot pin 155. This allows the outer end 87 of the marking instrument arm 43 to be displaced downwardly to the position depicted in FIG. 7 or the position depicted in FIG. 2 by the numeral 87', thus causing the stylus 41 to scribe the radial line segment 119 upon the disk 19 (FIG. 8).

Conversely, releasing the tension on the cable 169 or the pull spring 171 allows the spring 147 to drive the bell crank 139 counterclockwise as viewed in FIG. 3 which urges the pin 143 to slide in the aperture 145 to a position depicted in FIGS. 3 and 6 of the drawings. In other words, the cam bar 149 is caused to pivot about the pivot pin 155 which acting against the canted pin 159 cams the pin 159 upwardly to the position depicted in FIG. 6 of the drawings, thus causing the stylus 41 to scribe the radial line segment 123 upon the disk 19 (FIG. 8).

For obvious reasons, it is desirable that the device 11 be mounted so as to be substantially tamperproof. Therefore, a typical installation is depicted in FIG. 4 wherein a plurality of screws 183 or the like extend through suitable apertures in the base 49 for attachment of the device 11 to the suitable portion 13 of the vehicle, i. e., the screws 183 being unaccessible since the cover 51 is locked by the lock means 53.

It will be apparent to those skilled in the art that the bell crank 139 may be fractionally rotated by means other than the cable 169, e. g., an electric solenoid could be used for this purpose, which would then be responsive to opening of the doors 15, 17 in a manner obvious to those skilled in the art. Therefore, it is the intent of the present invention that while the solenoid alluded to above is not shown, that such an arrangement is within the spirit and scope of the present invention.

In order to properly orientate the disk 19 on the platen 23, a positioning pin 185 preferably is attached to the platen 23 in a well known manner and is clearly shown in the drawings. The disk 19, after being properly orientated with respect to the time of day, etc., is caused to be impaled by the pin 185, thus preventing disorientation thereof with respect to the platen 23 as the platen rotates.

Although the invention has been described and illustrated with respect to a preferred embodiment thereof, it is not to be so limited since changes and modifications may be made therein which are within the full intended scope of the invention.

I claim:

1. An activity recording device for attachment to a vehicle to record distinctly the respective periods of time in which the vehicle is standing, in motion, and/or certain doors thereof are open or closed, said device comprising a disk having certain indicia thereon, planar platen means for supporting said disk, a horizontally disposed shaft, said platen means and said disk each being provided with a concentric aperture which receives said shaft, said platen means being disposed in a vertical plane and being attached to said shaft, clock means coupled to said shaft for rotatably driving said disk at a predetermined rate, pointed marking instrument means for engaging and marking said disk, marking instrument arm means including vibration sensitive means for supporting said marking instrument means, helix drive means for gradually moving said marking instrument arm means ever closer to said shaft as said platen means rotates, means for limiting the vibration of said marking instrument means between a first position wherein said marking instrument is a predetermined radial distance from said shaft and a second position wherein said marking instrument is further away from said shaft, and means responsive to the opening of certain doors of the vehicle for rapidly moving said marking instrument vertically between said first position and a third position wherein said marking instrument is closer to said shaft than said predetermined distance, said marking instrument scribing said disk with ever decreasing concentric circles as said platen means rotates and with radial scribe marks corresponding to the vertical movement of said marking instrument.

2. The device of claim 1 in which is included drive arm means, said drive arm means and said marking instrument arm means each having inner and outer ends thereto, enclosure means including a base, arm support means for supporting said marking instrument arm means and said drive arm means, said arm support means being attached to said base, first pivot means for pivotally attaching the inner ends of said marking instrument arm means and said drive arm means to said arm support means, said first pivot means being disposed parallel with said shaft, said marking instrument arm means and said drive arm means normally being parallel one with the other, said platen means includes a planar face side and a back side, said helix drive means includes providing said back side of said platen means with an elongated helical groove, drive pin means attached to the outer end of said drive arm means for engaging said helical groove, said drive arm means being pivoted about said first pivot means as the outer end thereof gradually moves ever closer to said shaft, and means for coupling said marking instrument arm means to said drive arm means to cause said marking instrument arm means to move in unison with said drive arm means, the outer end of said drive arm means being adjacent said back side of said platen means and said marking instrument arm means being adjacent said face side thereof.

3. The device of claim 2 in which is included second pivot means for pivotally attaching said marking instrument arm means to said first pivot means, said first pivot means being provided with a transverse aperture adjacent the outer end thereof which receives said second pivot means, said marking instrument arm means being provided with a transverse aperture which also receives said second pivot means, said marking instrument arm means being free to be manually pivoted substantially vertically about said second pivot means between marking instrument engaged and marking instrument disengaged positions, moving said marking instrument arm to said marking instrument disengaged position being effective to disengage said means coupling said marking instrument arm means to said drive arm means.

4. The device of claim 3 in which is included spring means for urging said outer end of said drive arm means radially away from said shaft.

5. The device of claim 4 in which is included means for overpowering said spring means when said marking instrument arm means is in said marking instrument engaged position to allow said marking instrument arm means and said drive arm means to gradually gravitate toward said shaft as said drive pin means of said drive arm means tracks said helical groove.

6. The device of claim 5 in which said enclosure means includes a cover hingedly attached to said base, said cover having open and closed positions thereto, and which device includes means for engaging said closed cover to prevent said marking instrument arm means from moving away from said marking instrument engaged position, said cover engaging means being attached to said marking instrument arm means.

7. The device of claim 6 in which is included means for selectively adjusting the sensitivity of said vibration sensitive means.

8. The device of claim 3 in which said means responsive to the opening of certain doors of the vehicle includes bellcrank means pivotally attached to said arm support means and being free to pivot about a vertical axis, horizontal pin means, said arm support means being provided with a horizontally extending aperture, said horizontal pin means being slidably received in said horizontal aperture, spring means for urging said horizontal pin means towards said drive arm means, said drive arm means includes cam bar means having inner and outer ends thereto with said inner end being pivotally attached to said drive arm means intermediate thereof and being free to pivot about a substantially vertical axis, said horizontal pin means having one of the ends thereof resting against said outer end of said cam bar means with the opposite end resting against said bellcrank means, said means for coupling said marking instrument arm means to said drive arm means includes canted pin means for engaging said cam bar means, said canted pin means being fixedly attached to said marking instrument arm means adjacent said inner end thereof and projecting upwardly in a non-horizontal non-vertical axis towards said drive arm means, said drive arm means being provided with an enlarged aperture for allowing said canted pin means to freely pass therethrough, said outer end of said cam bar means being provided with an elongated canted aperture having the major axis thereof extending parallel with said cam bar means and the minor axis thereof being canted upwardly in a non-horizontal non-vertical axis towards said bellcrank means, said canted aperture slidably receiving said canted pin means selectively when said marking instrument arm means is in said marking instrument engaged position, and cable means for fractionally rotating said bellcrank means, one end of said cable means being attached to said bellcrank means and the opposite end thereof being adapted for attachment to the door of the vehicle whereby opening the door thereof being effective to cause said bellcrank means to rotate.

9. An activity recording device for attachment to a vehicle to record the periods of time in which the vehicle is standing and in motion, said device comprising enclosure means, a disk having certain indicia thereon, planar platen means for supporting said disk, a horizontally disposed shaft, said platen means and said disk each being provided with a concentric aperture which receives said shaft, said platen means being disposed in a vertical plane and being attached to said shaft, clock means coupled to said shaft for rotatably driving said disk at a predetermined rate, pointed marking instrument means for engaging and marking said disk, marking instrument arm means including vibration sensitive means for supporting said marking instrument means whereby the normal vibrations of the moving vehicle being effective to cause said marking instrument means to move vertically while engaging said disk, said platen means includes a planar face side and a back side, said back side being provided with an elongated helical groove, drive pin means for engaging said helical groove, drive arm means for supporting said drive pin means, arm support means, pivot means for pivotally attaching said marking instrument arm means and said drive arm means to said arm support means, and means for coupling said marking instrument arm means to said drive arm means, said drive arm means and said marking instrument arm means being pivoted about said pivot means as said drive pin means tracks said helical groove.

* * * * *